H. W. MORROW.
ICE CUTTING MACHINE.
APPLICATION FILED MAR. 20, 1913.
1,100,687.
Patented June 16, 1914.
3 SHEETS—SHEET 1.
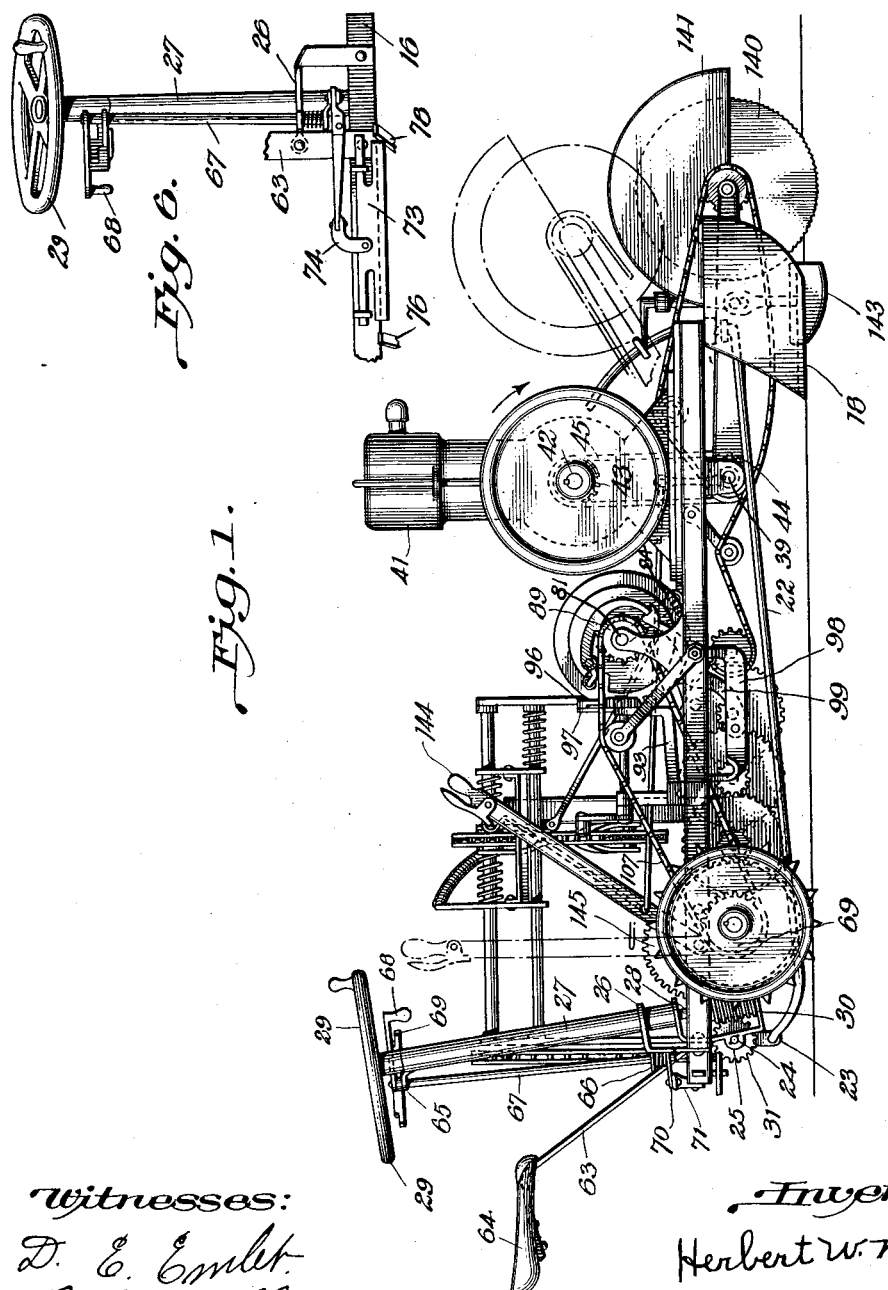
Witnesses:
D. E. Emlet.
B. F. Kell
Inventor:
Herbert W. Morrow.

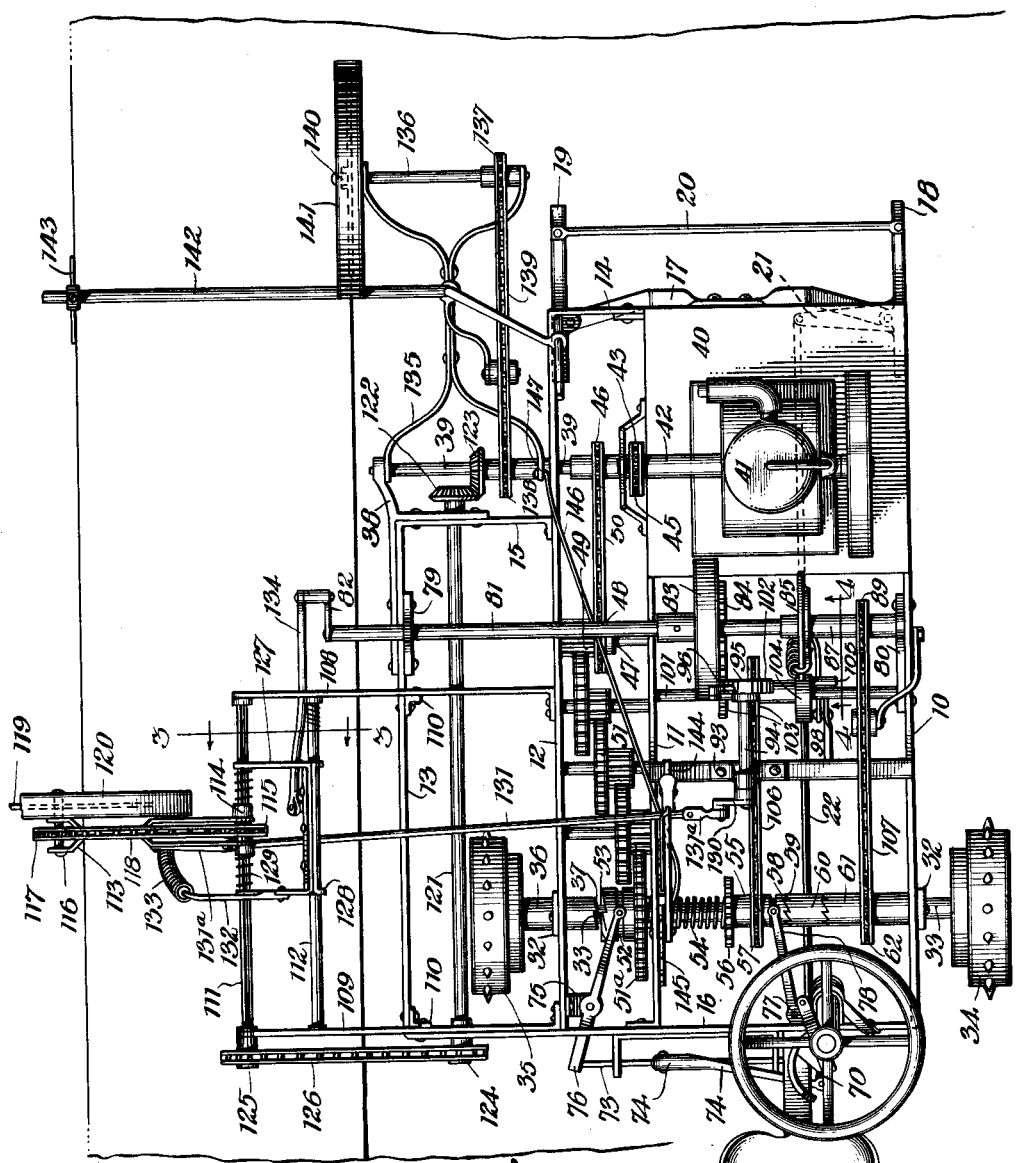

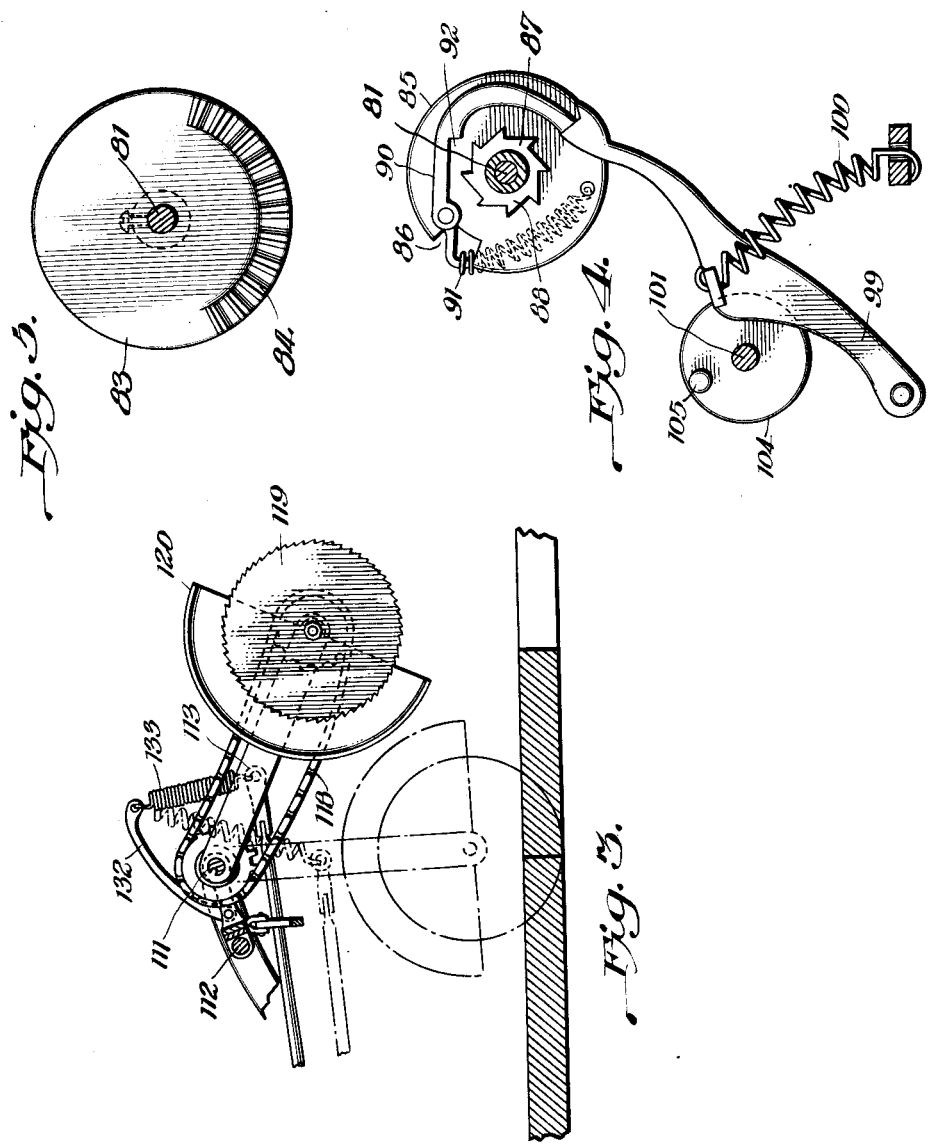

UNITED STATES PATENT OFFICE.

HERBERT W. MORROW, OF LOYSVILLE, PENNSYLVANIA.

ICE-CUTTING MACHINE.

1,100,687.   Specification of Letters Patent.   Patented June 16, 1914.

Application filed March 20, 1913. Serial No. 755,816.

*To all whom it may concern:*

Be it known that I, HERBERT W. MORROW, a citizen of the United States, residing at Loysville, in the county of Perry and State of Pennsylvania, have invented a new and useful Ice-Cuttting Machine, of which the following is a specification.

This invention relates to ice cutting machines.

The object of the invention resides in the provision of an ice cutting machine which is designed to cut the ice in the form of rectangular blocks, same being accomplished through a medium of a pair of rotary saws while the machine is moving continuously in one direction.

A further object of the invention resides in the provision of an ice cutting machine of the character referred to in which the cross cut saw during its operation is moved rearwardly of the machine at the same speed the machine is traveling ahead whereby the operation of the cross cut saw may be effected without interfering with the advancing movement of the machine, such a condition serving to greatly increase the amount of ice harvested in a given time.

A still further object of the invention resides in the provision of an ice cutting machine in which the various parts can be easily controlled by a single operator, and which will be efficient in use strong and durable.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of an ice cutting machine constructed in accordance with the invention; Fig. 2, a plan view of same; Fig. 3, a section on the line 3—3 of Fig. 2; and Fig. 4, a section on the line 4—4 of Fig. 2. Fig. 5 is a detail view of disks 83, the shaft 81 being shown in section. Fig. 6 is a fragmentary rear elevation of the machine showing the clutch operating means.

Referring to the drawings the machine is shown as comprising a main frame which includes longitudinal members 10, 11, 12 and 13, a front member 14 connecting the longitudinal members 10, 11 and 12, a second front member 15 connecting the longitudinal members 12 and 13 and a rear member 16 mutually connecting the rear end of all of said longitudinal members. Mounted upon the front member 14 is a bracket 17 and pivotally mounted between the ends of this bracket and the ends of the front member 14 are runners 18 and 19 the forward ends of which are united by a connecting rod 20 whereby pivotal movement imparted to one of said runners will produce a corresponding pivotal movement of the other. The runner 18 is provided at its rear end with an inwardly directed arm 21 the free end of which is connected by a link 22 to a crank arm 23 carried by a shaft 24, said shaft being journaled in a bracket 25 mounted on the rear member 16. Mounted in a bracket 26 carried by the rear member 16 is a steering column 27 in which is rotatably mounted a steering shaft 28. The upper end of the shaft 28 carries a steering wheel 29 while the lower end of said shaft has mounted thereon a worm 30 which meshes with a worm wheel 31 fixed on the shaft 24. By this construction it will be apparent that by operating the steering wheel 29 to rotate the shaft 28 the runners 18 and 19 will be correspondingly moved on their pivots to effect the steering of the machine. Journaled in suitable bearings 32 carried by the longitudinal members 10 and 12 is a drive shaft 33 which has fixed on one end thereof adjacent the outer side of the longitudinal member 10 a traction wheel 34. Fixedly mounted on the other end of the shaft 33 is a traction wheel 35 and also a collar 36 the inner end of which is provided with teeth 37 for a purpose that will presently appear. Projecting forwardly from the front member 15 is a bracket 38 and journaled in this bracket and in bearings carried by the longitudinal members 11 and 12 is a transverse shaft 39. Mounted upon the forward end of the longitudinal members 10 and 11 is a platform 40 upon which is mounted a motor 41 preferably of the explosive type and embodying a crank shaft 42 upon which is fixed a sprocket wheel 43. Fixed on the shaft 39 in line with the sprocket wheel 43 is a sprocket wheel 44 and traveling on these sprocket wheels 43 and 44 is a sprocket chain 45. Also fixed upon the shaft 39 between the sprocket wheel 44 and the longitudinal member 12 is a sprocket wheel 46. Journaled between the longitudinal members 11 and 12 rearwardly of the shaft 39 is a shaft 47 which has fixed thereon a sprocket wheel 48 and a pinion 49. The sprocket wheel 48 is disposed in line with the sprocket wheel 46 and traveling on said sprocket wheels 46 and 48 is a sprocket chain 50.

Mounted between the longitudinal members 11 and 12 and between the shaft 47 and the drive shaft 33 is a diminishing train of gears 51, the gear of said train disposed farthest from the shaft 47 being loosely mounted on the drive shaft 33 and provided with a hub 52 having teeth 53 formed on the end thereof adjacent the collar 36, which teeth are adapted to coöperate with the teeth 37 to connect the drive shaft 33 with the motor 41. It will be noted that the gear 51ᵃ of the train 51 which is provided with the hub 52 is capable of limited movement longitudinally of the drive shaft 33 and is normally held in position to engage the teeth 53 with the teeth 37 by means of a spring 54 encircling the drive shaft 33 and having one end bearing against said gear and the other end against a sleeve 55 rotatably and slidably mounted on the drive shaft 33. Formed on the sleeve 55 are sprocket wheels 56 and 57 and the end of the sleeve 55 remote from the spring 54 is provided with teeth 58 adapted to coöperate with teeth 59 formed on the adjacent end of a sleeve 60 which latter is slidably and nonrotatably mounted on the drive shaft 33. Rotatably mounted on the drive shaft 33 between the sleeve 60 and the longitudinal member 10 is a sleeve 61 which has formed thereon a sprocket wheel 62. Supported upon the rear member 16 is an upwardly extending arm 63 which carries a seat 64. Rotatably mounted in a bracket 65 carried at the upper end of the steering column 27 and in a bracket 66 mounted on the arm 63 is a clutch shaft 67. This shaft carries at its upper end an operating crank 68 which coöperated with a segment 69 mounted on the bracket 65 for the purpose of securing the shaft 67 against rotation. The lower end of the shaft 67 is provided with a crank arm 70 to the free end of which latter is pivoted a coupling 71. Slidably mounted in brackets 72 extending rearwardly from the member 16 is a clutch throwing plate 73 and this plate is connected to the coupling 71 by means of a link 74. By this construction it will be apparent that by rotating the shaft 67 the plate 73 can be moved transversely of the machine. Pivotally mounted upon a bracket 75 carried by the longitudinal member 12 is a yoke lever 76 which has the yoke end thereof suitably engaged with the hub 52, while the opposite end thereof projects rearwardly of the member 16 in position to be engaged by one end of the plate 73 when the latter is moved in one direction. Pivotally mounted on a bracket 77 carried by the member 16 is a yoke lever 78 which has the yoke end thereof suitably engaged with the sleeve 55, while the other end of said lever 78 projects rearwardly of the member 16 in position to be engaged by the end of the plate 73 when the latter is moved in one direction.

Mounted upon the longitudinal members 10 and 13 are brackets 79 and 80 in which is journaled a shaft 81. Carried by the shaft 81 at the end thereof adjacent the member 13 is a crank arm 82 for a purpose that will presently appear. Fixed on the shaft 81 is a disk 83 which has formed on one side thereof a plurality of teeth 84 arranged in arcuate formation. Also fixed upon the shaft 81 adjacent the toothed side of the disk 83 is a disk 85 provided with a recess 86 in its periphery. Rotatably mounted on the shaft 81 is a sleeve 87 which has formed integral therewith a ratchet 88 disposed adjacent the disk 85 and further has formed integral therewith a sprocket wheel 89. Pivoted on the disk 85 is a lever 90 one end of which is bent laterally through the recess 86 and has secured thereto the terminal of a spring 91. The other terminal of this spring is suitably anchored to the disk 85. Formed on the lever 90 is a tooth 92 adapted to coöperate with the ratchet 88, said lever being normally held in position to effect such coöperation by the spring 91. Mounted upon the members 10 and 11 is a bracket 93 in which is journaled longitudinally of the machine a shaft 94. Mounted on one end of the shaft 94 is a gear 95 which is adapted to coöperate with the teeth 84 during each rotation of the disk 83. Backward rotation of the shaft 94 is prevented by a pawl 96 mounted upon an arm 97 on the bracket 93 and coöperating with the teeth of the gear 95.

Supported from the member 10 and the bracket 93 is a bracket 98 which has pivoted thereon a tripping lever 99 one end of which is positioned to engage the end of the lever 90 which is remote from the spring 91 for the purpose of moving said lever 90 against the influence of said spring and disengaging the tooth 92 from the ratchet 88 during each revolution of the disk 85. The tripping lever 99 is normally held in position to engage the lever 90 by means of a spring 100. Journaled between the members 10 and 11 transversely of the machine is a shaft 101 upon which is fixed a collar 102 having formed integral therewith at one end sprocket wheels 103 and at its other end a disk 104 provided with a laterally directed finger 105 adapted to engage the tripping lever 99 during each revolution of the shaft 101 and move said lever out of engagement with the lever 90 to permit the tooth 92 to move into engagement with the ratchet 88 and effect rotation of the shaft 81 as will hereinafter appear. It will be noted that upon the completion of each rotation of the shaft 81 the lever 99 will engage the lever 90 and disconnect the disk 85 and of course the shaft 81 from the collar 87. Adapted to interchangeably travel on the sprocket wheels 103 and the sprocket wheels 56 and 57 is a sprocket chain 106, while a sprocket chain 107 is adapted to travel on the sprocket wheel 62 and the sprocket wheel 89 and through the instrumentality of these sprocket chains the rotation of the drive shaft 33 is adapted to be imparted to the shafts 81 and 101.

Secured to the member 12 and extending laterally and upwardly therefrom are spaced arms 108 and 109. These arms are strengthened by braces 110 which connect intermediate portions thereof with the member 13. Journaled in the free ends of the arms 108 and 109 is a shaft 111 and connecting said arms just inwardly of said shaft is a rod 112. Slidably and rotatably mounted on the shaft 111 is a frame 113 and slidably and non-rotatably mounted on said shaft between the members of this frame is a sleeve 114 which has formed thereon a sprocket wheel 115. Journaled in the free end of the frame 113 is a shaft 116 which has fixed thereon a sprocket wheel 117 and traveling on the sprocket wheel 117 and the sprocket wheel 115 is a sprocket chain 118 whereby the rotation of the shaft 111 is imparted to the shaft 116. Fixed on one end of the shaft 116 is the cross cut saw 119 of the machine, which saw is partially covered by a shield 120 carried by the frame 113. Journaled between the front member 15 and the rear member 16 is longitudinal shaft 121 which has fixed on the forward end thereof a beveled gear 122 which meshes with a beveled gear 123 fixed on the shaft 39. Fixed on the rear end of the shaft 121 is a sprocket wheel 124 which is disposed in line with a sprocket wheel 125 fixed on the rear end of the shaft 111 and traveling on the sprocket wheels 124 and 125 is a sprocket chain 126 whereby the rotation of the shaft 121 is imparted to the shaft 111. Slidably mounted on the shaft 111 and rod 112 are connected opposed U-shaped members 127 and 128, the arms of the member 127 slidably engaging the shaft 111 and embracing the sleeve 114. Springs 129 are interposed between the ends of the sleeve 114 and the adjacent arms of the member 127 so as to permit yielding of the frame 113.

The shaft 94 carries at its inner end a crank arm 130 which is connected to the frame 113 by a link 131 having a short link 131ª pivoted on each end whereby the rotation of the shaft 94 will swing the free end of the frame 113 inwardly to effect the cross cut by the saw 119. Carried by the U-shaped member 127 is an arm 132 which has secured thereto one end of a spring 133, the other end of said spring being attached to the frame 113 and constantly tends to hold the frame in non-cutting position. The U-shaped members 127 and 128 are connected by a link 134 to the crank arm 82 carried by the shaft 81 whereby said member and frame 113 together with the saw 119 will be moved rearwardly during the cutting operation of said saw at the same speed at which the machine is advancing, the various parts being so timed as to produce this result.

Pivoted on the shaft 39 is a frame 135 which has journaled in its free end a shaft 136. Fixed on this shaft 136 is a sprocket wheel 137 which alines with a sprocket wheel 138 fixed on the shaft 39 and traveling on the sprocket wheels 137 and 138 is a sprocket chain 139. Also fixed on the shaft 136 is a circular saw 140 which is partially covered by a shield 141. Projecting laterally from the frame 135 is an arm 142 upon which is adjustably mounted a gage 143. As the frame 135 is free to swing it is evident that the saw 140 can be elevated out of engagement with the ice. This elevation of the saw 140 out of engagement with the ice is effected by a lever 144 pivoted on a segment 145 which is mounted upon the member 11, said lever being connected by a link 146 to an arm 147 carried by the frame 135.

What is claimed is:—

1. In an ice cutting machine, the combination of a motor propelled body, a saw carried by the body arranged to cut in the direction in which the machine is traveling, a second saw mounted on the body for movement transversely of the latter, means for moving said second named saw intermittently transversely of the machine to effect the cross cut of the ice, means for moving said second saw during its cutting operation rearwardly of the machine, yielding means permitting limited movement of the second named saw laterally in either direction during the cutting operation, and means for operating said saws.

2. In an ice cutting machine, the combination of a motor propelled body, a saw carried by the body arranged to cut in the direction in which the machine is traveling, a second saw mounted on the body for cutting movement transversely of the body and for lateral movement longitudinal of the body, a pair of shafts rotatably mounted on the body, connections between one of said shafts and the second saw whereby the rotation of the shaft will move the said saw transversely of the body, connections between the other shaft and the second saw for moving the latter longitudinally of the body, and means for intermittently and simultaneously rotating said shafts during the travel of the body.

HERBERT W. MORROW.

Witnesses:
D. E. EMLET,
B. F. KELL.